United States Patent
Schimon

(10) Patent No.: US 9,600,172 B2
(45) Date of Patent: Mar. 21, 2017

(54) PULL DOWN NAVIGATION MODE

(71) Applicant: Apple Inc., Cupertino, CA (US)

(72) Inventor: David Schimon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 363 days.

(21) Appl. No.: 14/147,175

(22) Filed: Jan. 3, 2014

(65) Prior Publication Data

US 2015/0193137 A1 Jul. 9, 2015

(51) Int. Cl.
*G06F 3/048* (2013.01)
*G06F 3/0488* (2013.01)
*G06F 3/0482* (2013.01)
*G06F 3/0485* (2013.01)

(52) U.S. Cl.
CPC .......... *G06F 3/0488* (2013.01); *G06F 3/0482* (2013.01); *G06F 3/0485* (2013.01)

(58) Field of Classification Search
CPC ... G06F 3/04855; G06F 3/0482; G06F 3/0488
USPC ........................................................ 715/883
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,580,442 B1 * | 6/2003 | Singh | G06F 3/0488 345/173 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 9,158,445 B2 * | 10/2015 | Wong | G06F 3/0488 |
| 9,245,259 B2 * | 1/2016 | Bovet | G06F 3/0488 |
| 9,250,768 B2 * | 2/2016 | Kim | G06F 3/0482 |
| 9,274,682 B2 * | 3/2016 | Hinckley | G06F 3/0483 |
| 9,280,261 B2 * | 3/2016 | Yach | G06F 1/1626 |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — David Phantana Angkool
(74) *Attorney, Agent, or Firm* — Morrison & Foerster LLP

(57) ABSTRACT

In examples of the disclosure, a user may both expand a menu and select a menu item by overscrolling the displayed content—that is, by attempting to scroll the displayed content past a boundary of the content (e.g., an edge of a document or image, among other possibilities). The menu may be expanded in response to detection of overscrolling, and the selection of the menu item may be based on a determined overscroll value.

27 Claims, 10 Drawing Sheets

(56) References Cited

U.S. PATENT DOCUMENTS

| | | | |
|---|---|---|---|
| 2003/0222923 A1* | 12/2003 | Li | G06F 3/0482 715/815 |
| 2006/0197753 A1 | 9/2006 | Hotelling | |
| 2009/0007012 A1* | 1/2009 | Mandic | G06F 3/0481 715/810 |
| 2009/0064055 A1* | 3/2009 | Chaudhri | G06F 3/04817 715/863 |
| 2010/0023883 A1* | 1/2010 | Khazaka | G06F 1/1626 715/760 |
| 2012/0216139 A1* | 8/2012 | Ording | G06F 3/0488 715/773 |
| 2013/0212535 A1* | 8/2013 | Kim | G06F 3/0482 715/841 |
| 2013/0332850 A1* | 12/2013 | Bovet | G06F 3/0488 715/752 |
| 2015/0019982 A1* | 1/2015 | Petitt, Jr. | G06F 3/0481 715/738 |
| 2015/0193137 A1* | 7/2015 | Schimon | G06F 3/0482 715/833 |
| 2016/0041702 A1* | 2/2016 | Wang | G06F 3/0482 715/830 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

PULL DOWN NAVIGATION MODE

FIELD OF THE DISCLOSURE

This relates generally to a scrolling in a user interface.

BACKGROUND OF THE DISCLOSURE

In a user interface of an electronic device, a menu may be displayed in a first portion of the user interface for navigating content displayed in a separate portion of the user interface. For example, a menu may allow a user to select a chapter, bookmark, and/or section of the content, among other possibilities. For a drop down menu, a user may cause the menu to expand by touching or clicking on the drop down menu, and a menu item may be selected by touching or clicking on a particular menu item.

SUMMARY OF THE DISCLOSURE

In examples of the disclosure, a user may both expand a menu and select a menu item by overscrolling the displayed content—that is, by attempting to scroll the displayed content past a boundary of the content (e.g., an edge of a document or image, among other possibilities). The menu may be expanded in response to detection of overscrolling, and the selection of the menu item may be based on a determined overscroll value.

For example, the user may touch the content area with a finger and drag to overscroll the content area, causing a menu to expand. Then, the user can continue to drag to further overscroll, thereby selecting different menu items depending on the total distance overscrolled. Once the desired menu item is selected, the user may liftoff the finger touching the screen, causing the menu to collapse and content associated with the selected menu item to be displayed.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

In a user interface of an electronic device, a menu may be displayed in a first portion of the user interface for navigating content displayed in a separate portion of the user interface. For example, a menu may allow a user to select a chapter, bookmark, and/or section of the content, among other possibilities, and the selected chapter or the like may be displayed in the content area of the user interface. For a drop down menu, a user may cause the menu to expand by touching or clicking on the drop down menu, and a menu item may be selected by touching or clicking on a particular menu item.

In examples of the disclosure, a user may both expand a menu and select a menu item by overscrolling the displayed content—that is, by attempting to scroll the displayed content past a boundary of the content (e.g., an edge of a document or image, among other possibilities). The menu may be expanded in response to detection of overscrolling, and the selection of the menu item may be based on a determined overscroll value.

For example, the user may touch the content area with a finger and drag to overscroll the content area, causing a menu to expand. Then, the user can continue to drag to further overscroll, thereby selecting different menu items depending on the total distance overscrolled. Once the desired menu item is selected, the user may liftoff the finger touching the screen, causing the menu to collapse and content associated with the selected menu item to be displayed.

Although examples disclosed herein may be described and illustrated herein primarily in terms of a touch screen interface, it should be understood that the examples are not so limited, but are additionally applicable to user interfaces generally, whether user input is accepted by touch screen, touch pad, mouse, keyboard, or other input device.

Figure 1A:
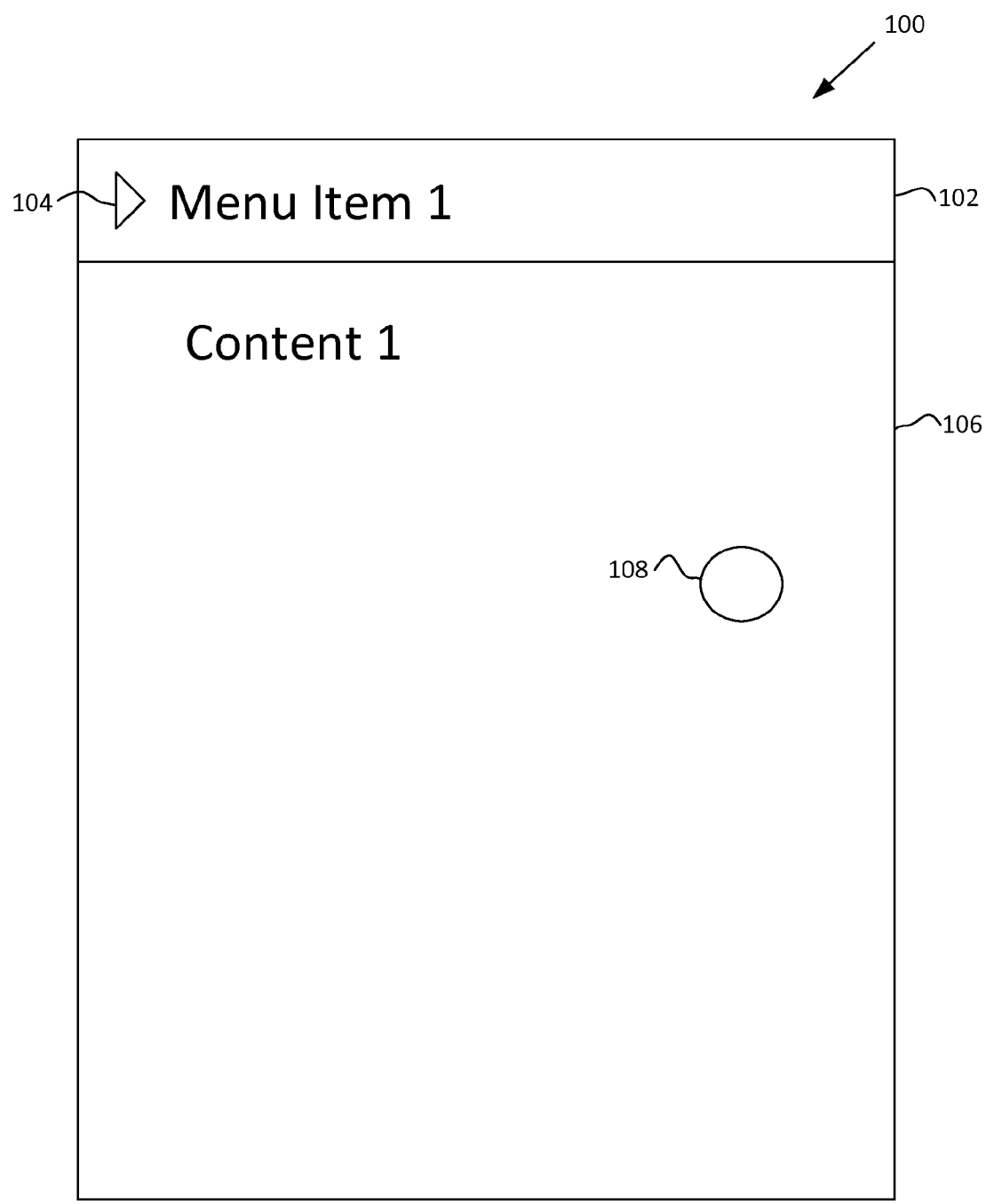
FIGS. 1A-1D illustrate an exemplary user interface of an electronic device according to examples of the disclosure.

FIG. 1A illustrates an exemplary user interface 100 of an electronic device, the user interface including an expandable menu 102 and a scrollable content area 106. The expandable menu 102 may be displayed in a collapsed state wherein only a single menu item (e.g., "Menu Item 1") may be displayed, the single menu item being one of a plurality of menu items associated with the menu. The single menu item 102 may indicate the menu item associated with the section of content currently displayed in the content area 106. An item indicator 104 may displayed adjacent to the menu item associated with the currently displayed section of content. User input 108 illustrates user input on the user interface 100, such as touch input, mouse input, or keyboard input, among other possibilities, although the user input may not be visually displayed in the user interface as it is in FIGS. 1A-1C.

The content area 106 may be scrollable wherein user input 108 may be accepted on the content area to scroll the content area such that undisplayed portions of the content may be displayed. For example, only a portion of an image may be displayed in the content area, and user input may be accepted dragging the image to display other portions of the image. If content in the content area 106 is dragged past a boundary of the content (e.g., an edge of an image or document), then an overscroll may be detected and the menu 102 may be expanded in response.

Figure 1B:
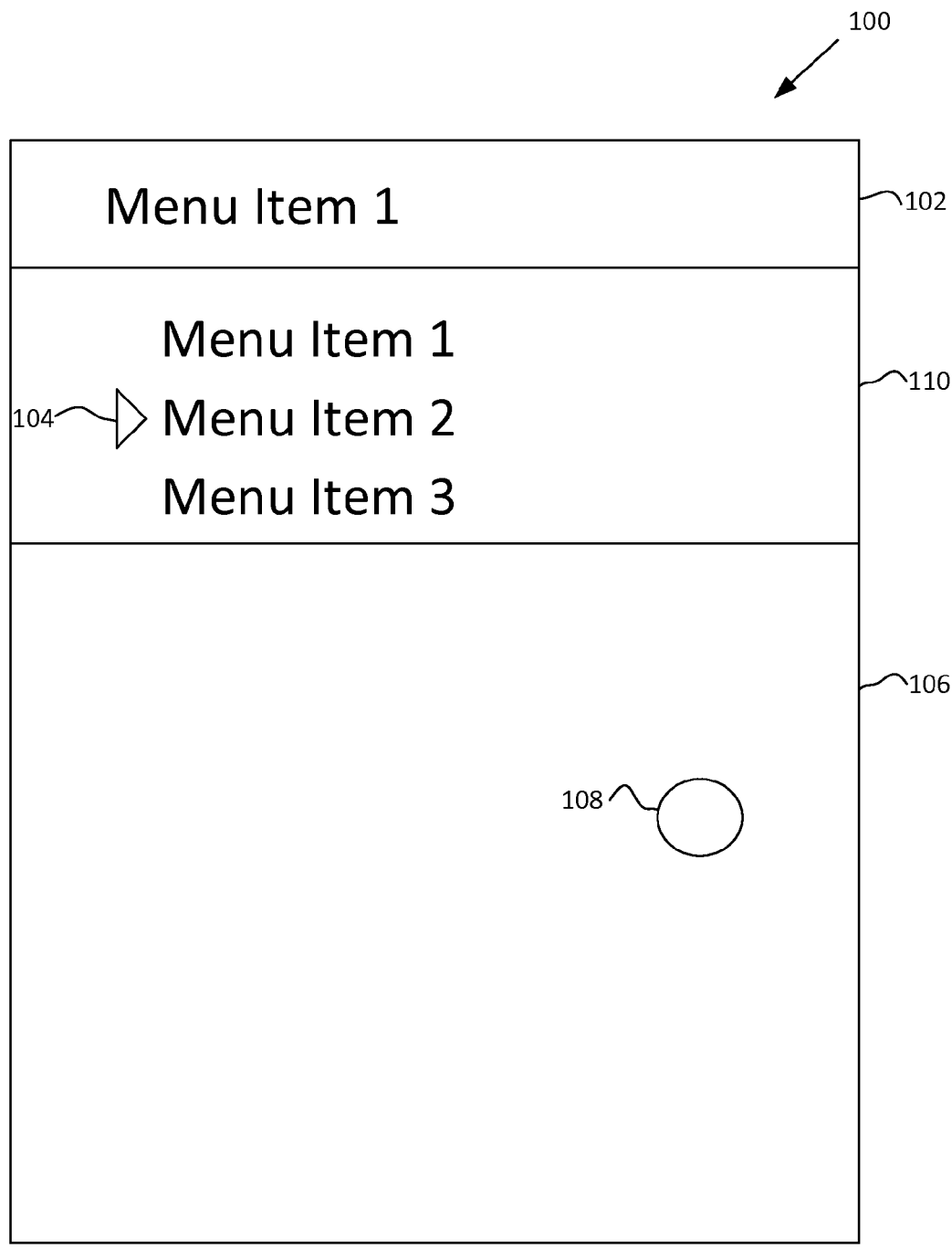
Figure 1C:
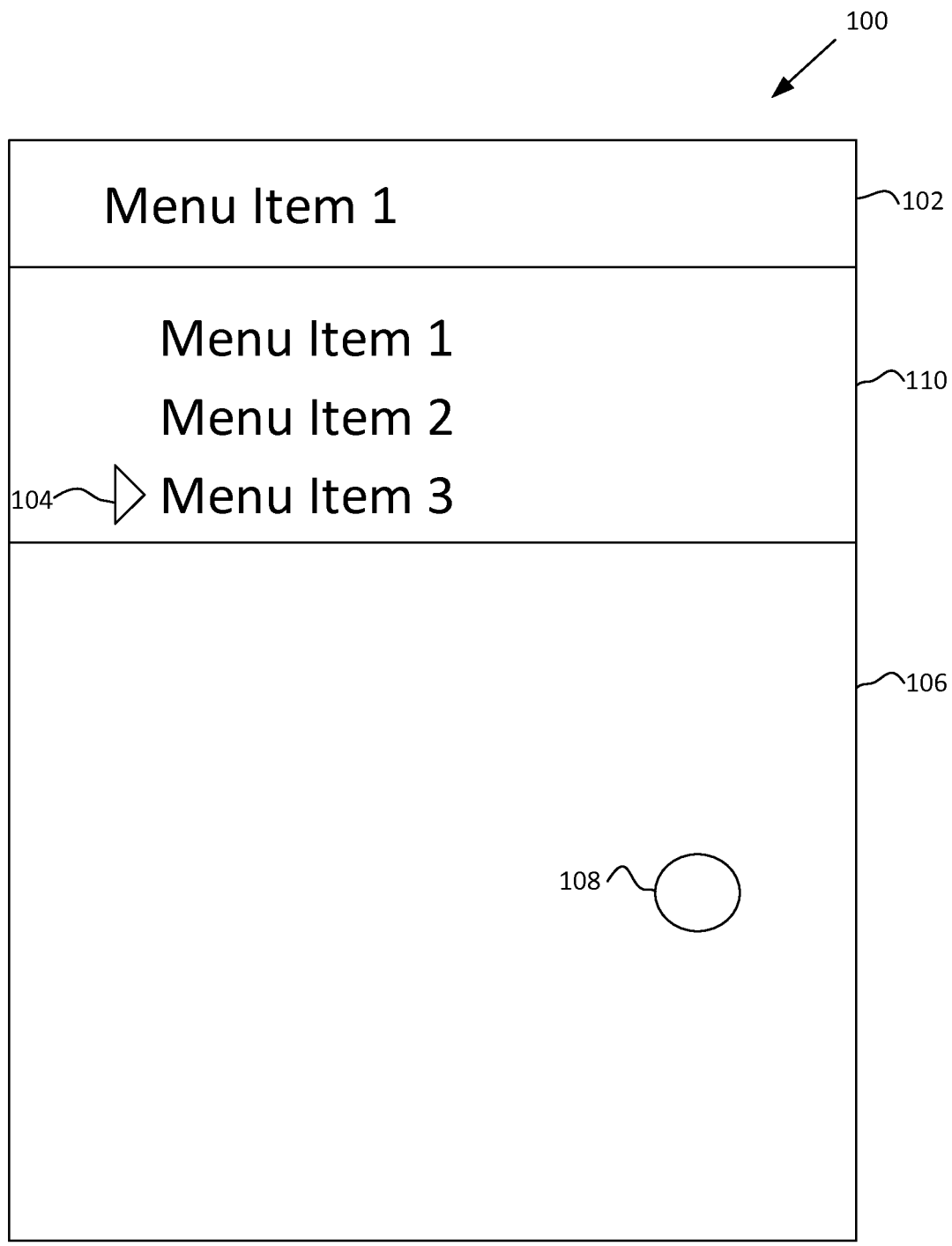

FIG. 1B illustrates an exemplary user interface 100 including an expanded menu 102 and 110 in response to detection of overscroll. The expanded menu may include the menu item 102 associated with currently displayed content and a list 110 of the plurality of menu items available for selection. A menu item of the list 110 may be selected based on a determined overscroll value. For example, an overscroll value may be determined based on the distance scrolled past the boundary of the content in the content area 106, and a second menu item (e.g., "Menu Item 2") may be selected if the overscroll value exceeds a first predetermined threshold. A third menu item (e.g., "Menu Item 3") may be selected if the overscroll value exceeds a second predetermined threshold, as illustrated in FIG. 1C. In some examples, the item indicator 104 may be displayed adjacent to a selected menu item, and expanding the menu may include displaying an animation of the item indicator 104 moving to a selected menu item. Alternatively or in addition to the above, the menu may expand in response to a determination that the overscroll value exceeds a predetermined threshold.

Figure 1D:
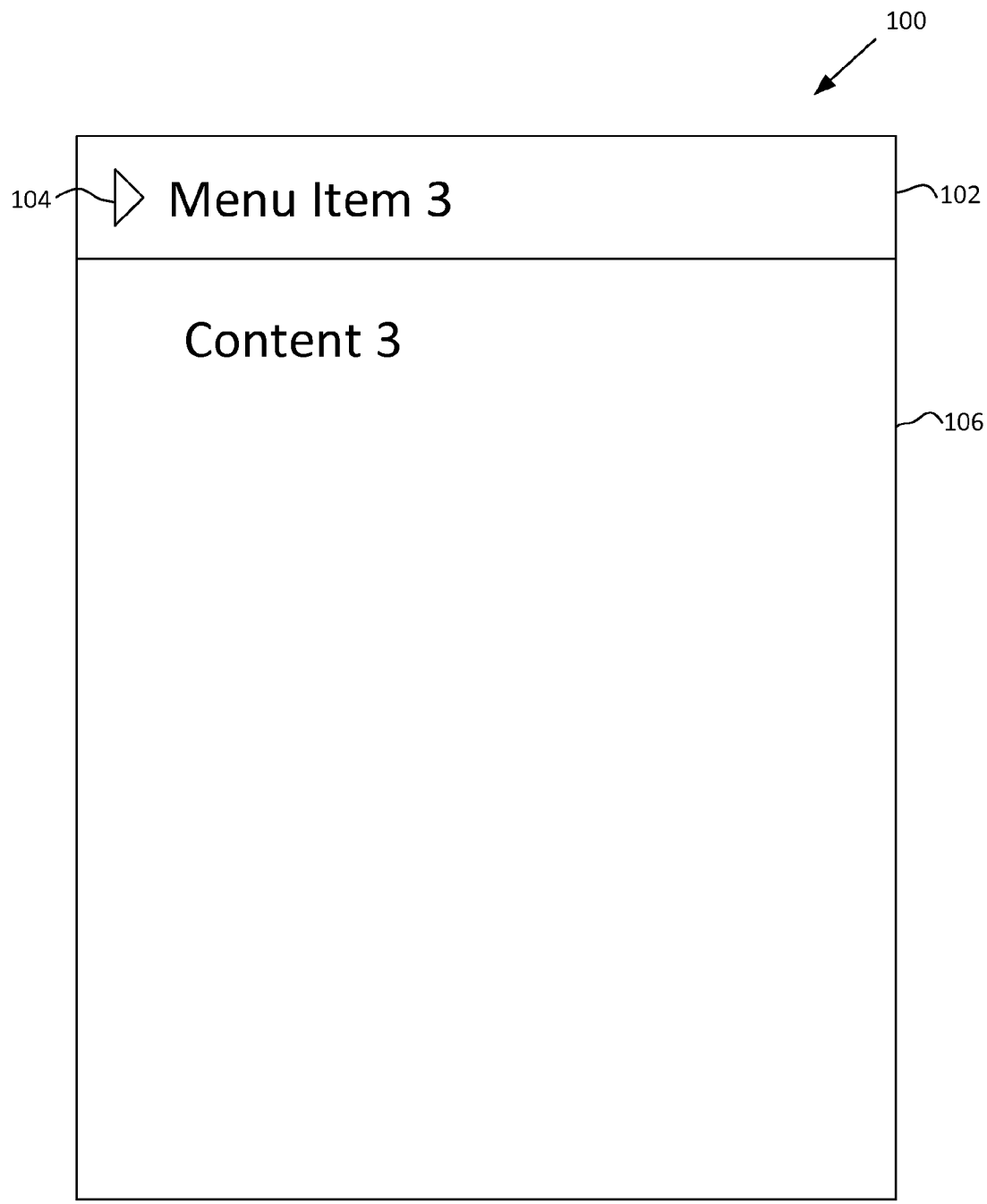

After a menu item is selected and user input is received requesting display of content associated with the selected menu item, the content may displayed and the menu may collapse, as illustrated in FIG. 1D. For example, user input may be received including a liftoff of a contact from the touch surface, thereby requesting display of content associated with the selected menu item.

Figure 2:
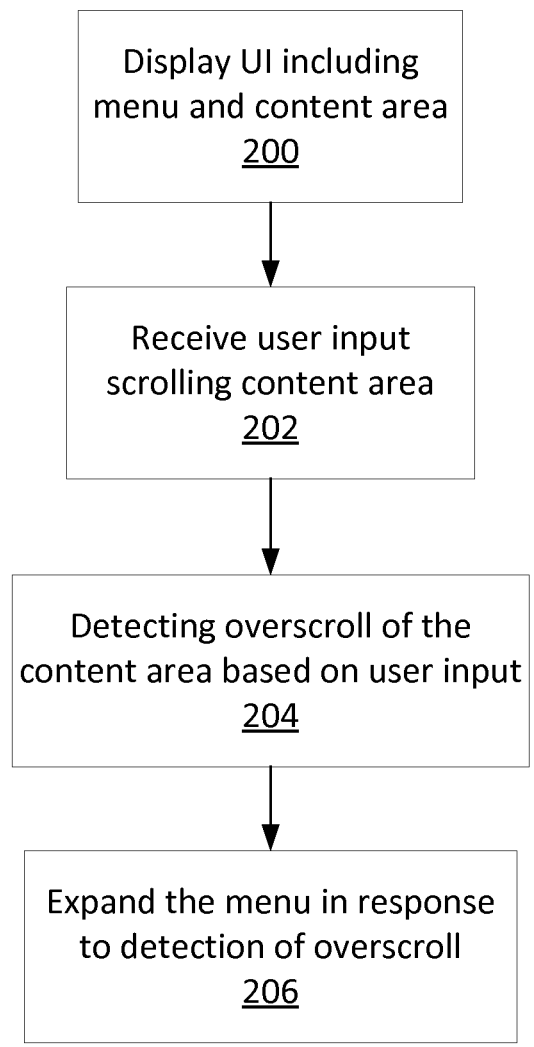
FIG. 2 illustrates an exemplary method of expanding a menu according to examples of the disclosure.

FIG. 2 illustrates an exemplary method of expanding a menu according to examples of the disclosure. A user interface (UI) may be displayed including an expandable menu and a scrollable content area (200), as illustrated in FIG. 1A. User input may be received scrolling the content area (202). For example, the user input may include touch input on the content area moving laterally across the touch surface to drag the content. In some examples, the user input can include mouse input clicking and dragging on content, among other possibilities.

Overscroll of the content area may be detected based on the user input (204). For example, it may be determined that the user input scrolls past a boundary of the content. In response to the detection of overscroll, the menu may be expanded (206). Expanding the menu may include displaying one or more additional items of the menu. In some examples, the menu may be expanded based on a determination that an overscroll value exceeds a predetermined threshold.

Figure 3:
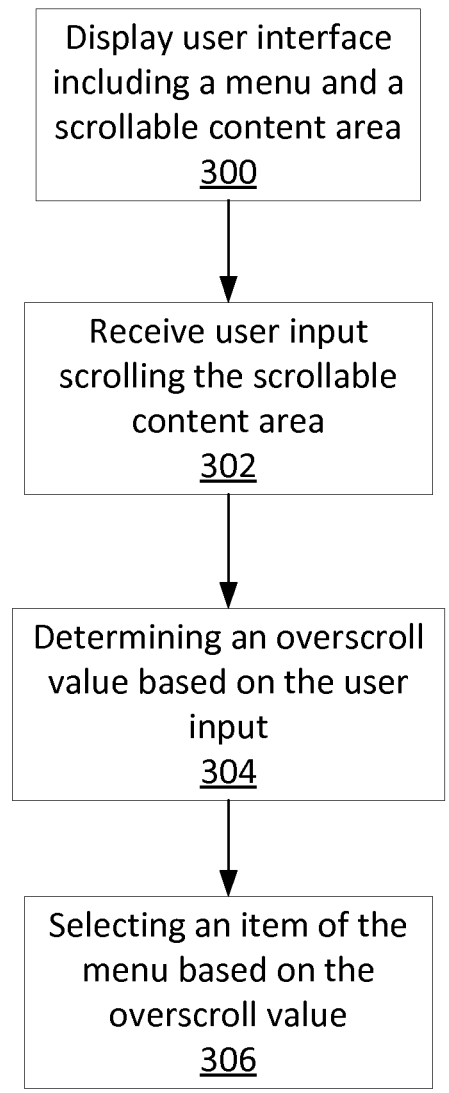
FIG. 3 illustrates an exemplary method of selecting a menu item according to examples of the disclosure.

FIG. 3 illustrates an exemplary method of selecting a menu item according to examples of the disclosure. A user interface may be displayed including a menu and a scrollable content area (300). User input may be received scrolling the content area (302). An overscroll value may be determined based on the user input (304). For example, a distance scrolled past a boundary of the content may be determined based on the user input, and the distance may be taken as the overscroll value, or some scalar multiple or other transformation of the distance may be taken as the overscroll value, among other possibilities. An item of the menu may be selected based on the overscroll value (306). For example, each menu item may be associated with a different predetermined overscroll threshold, and a menu item be selected based on a determination that the predetermined overscroll threshold associated with the menu item has been exceeded.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., spreadsheet apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one example, call APIs from different providers such as a set of APIs from an OS provider and another set of APIs from a plug-in provider and another set of APIs from another provider (e.g. the provider of a software library) or creator of the another set of APIs.

Figure 4:
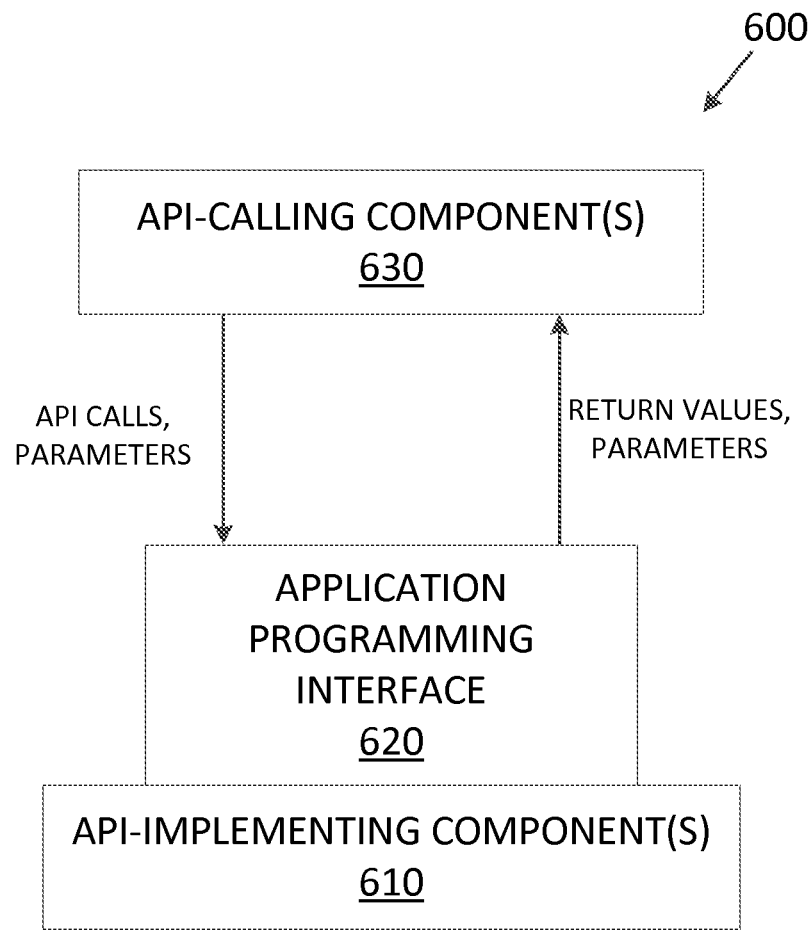
FIG. 4 is a block diagram illustrating an exemplary API architecture, which may be used in some examples of the disclosure.

FIG. 4 is a block diagram illustrating an exemplary API architecture, which may be used in some examples of the disclosure. As shown in FIG. 4, the API architecture 600 includes the API-implementing component 610 (e.g., an operating system, a library, a device driver, an API, an application program, software or other module) that implements the API 620. The API 620 specifies one or more functions, methods, classes, objects, protocols, data structures, formats and/or other features of the API-implementing component that may be used by the API-calling component 630. The API 620 can specify at least one calling convention that specifies how a function in the API-implementing component receives parameters from the API-calling component and how the function returns a result to the API-calling component. The API-calling component 630 (e.g., an operating system, a library, a device driver, an API, an application program, software or other module), makes API calls through the API 620 to access and use the features of the API-implementing component 610 that are specified by the API 620. The API-implementing component 610 may return a value through the API 620 to the API-calling component 630 in response to an API call.

It will be appreciated that the API-implementing component 610 may include additional functions, methods, classes, data structures, and/or other features that are not specified through the API 620 and are not available to the API-calling component 630. It should be understood that the API-calling component 630 may be on the same system as the API-implementing component 610 or may be located remotely and accesses the API-implementing component 610 using the API 620 over a network. While FIG. 4 illustrates a single API-calling component 630 interacting with the API 620, it should be understood that other API-calling components, which may be written in different languages (or the same language) than the API-calling component 630, may use the API 620.

The API-implementing component 610, the API 620, and the API-calling component 630 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 5:
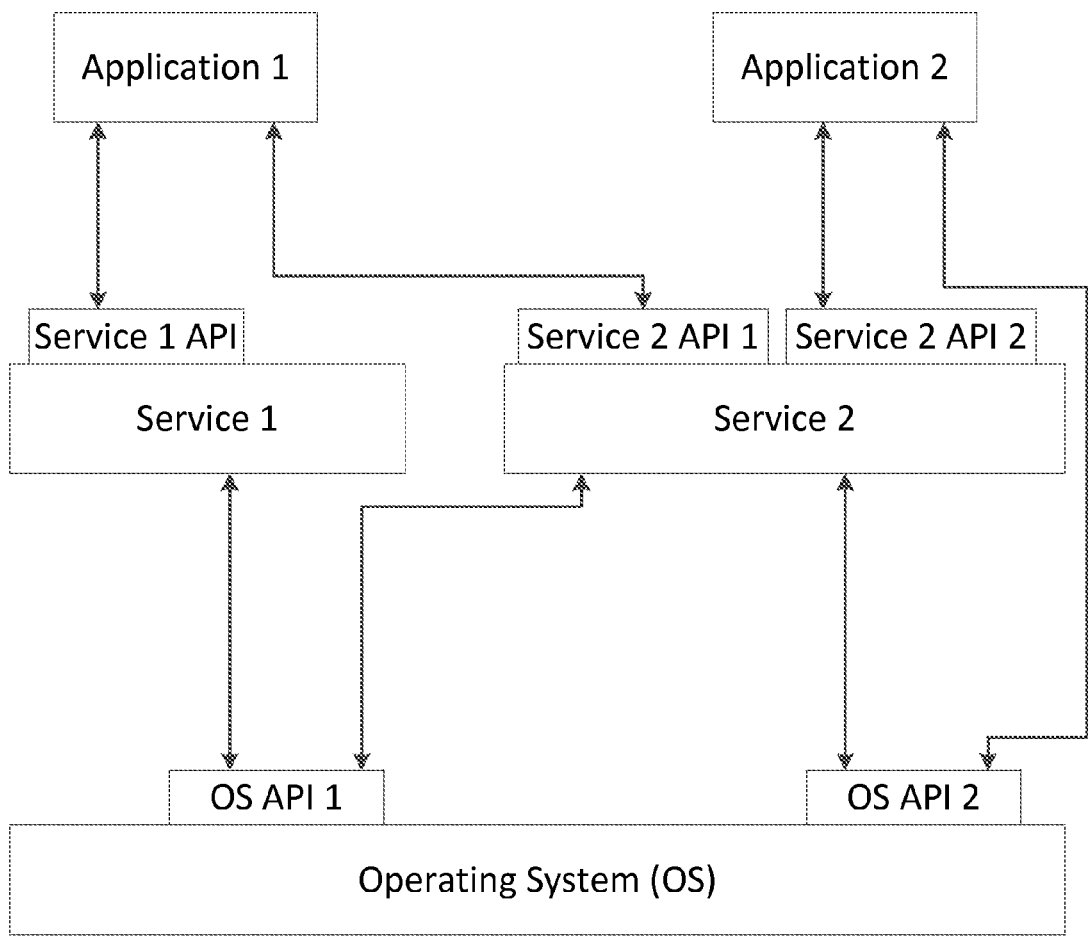
FIG. 5 illustrates an exemplary software stack of an API according to examples of the disclosure.

In the exemplary software stack shown in FIG. 5, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 6:
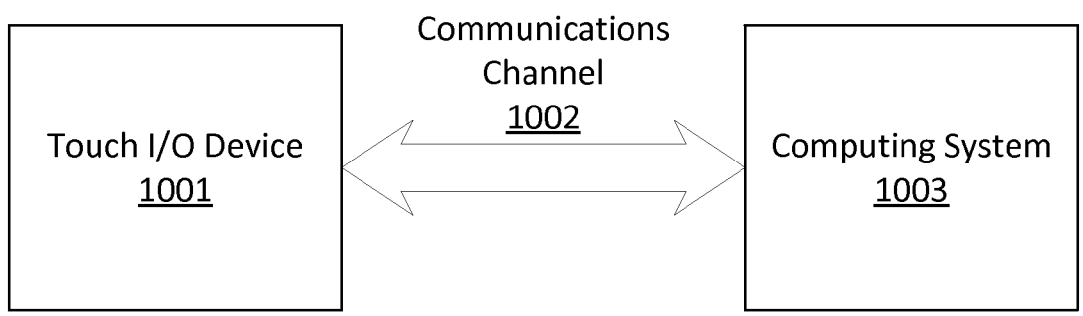
FIG. 6 is a block diagram illustrating exemplary interactions between the touch screen and other components of the device according to examples of the disclosure.

FIG. 6 is a block diagram illustrating exemplary interactions between the touch screen and the other components of the device. Described examples may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensing panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensing surface for receiving touch input.

In one example, touch I/O device 1001 embodied as a touch screen may include a transparent and/or semitransparent touch sensing panel partially or wholly positioned over at least a portion of a display. According to this example, touch I/O device 1001 functions to display graphical data transmitted from computing system 1003 (and/or another source) and also functions to receive user input. In other examples, touch I/O device 1001 may be embodied as an integrated touch screen where touch sensing components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 7:
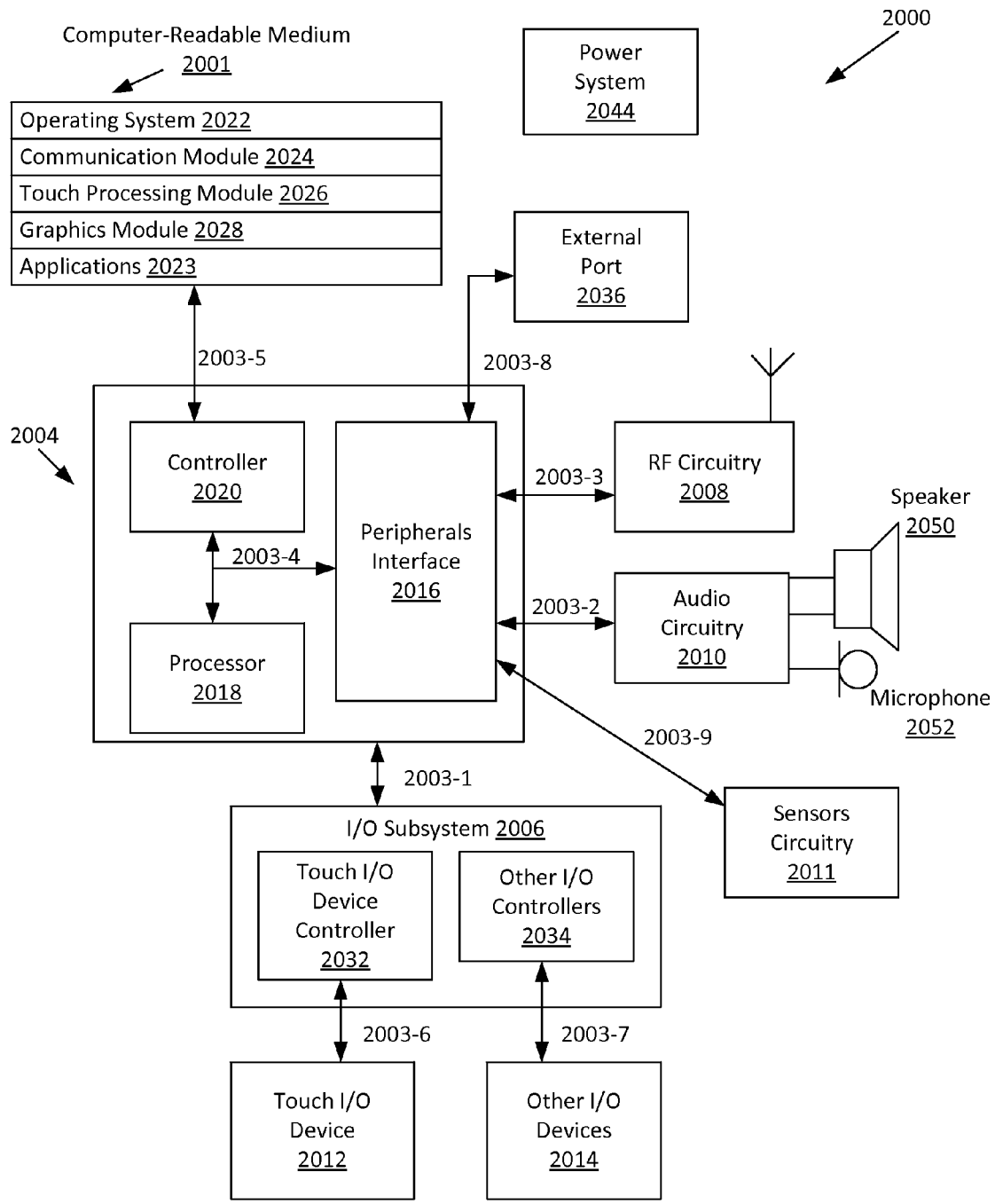
FIG. 7 is a block diagram illustrating an example of a system architecture that may be embodied within any portable or non-portable device according to examples of the disclosure.

Attention is now directed towards examples of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 7 is a block diagram of one example of system 2000 that generally includes one or more computer-readable mediums 2001, processing system 2004, I/O subsystem 2006, radio frequency (RF) circuitry 2008, audio circuitry 2010, and sensors circuitry 2011. These components may be coupled by one or more communication buses or signal lines 2003.

It should be apparent that the architecture shown in FIG. 7 is only one example architecture of system 2000, and that system 2000 could have more or fewer components than shown, or a different configuration of components. The various components shown in FIG. 7 can be implemented in hardware, software, firmware or any combination thereof, including one or more signal processing and/or application specific integrated circuits.

RF circuitry 2008 can be used to send and receive information over a wireless link or network to one or more other devices and includes well-known circuitry for performing this function. RF circuitry 2008 and audio circuitry 2010 can be coupled to processing system 2004 via peripherals interface 2016. Interface 2016 can include various known components for establishing and maintaining communication between peripherals and processing system 2004. Audio circuitry 2010 can be coupled to audio speaker 2050 and microphone 2052 and can include known circuitry for processing voice signals received from interface 2016 to enable a user to communicate in real-time with other users. In some examples, audio circuitry 2010 can include a headphone jack (not shown). Sensors circuitry 2011 can be coupled to various sensors including, but not limited to, one or more Light Emitting Diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, and various system sensors which can sense remaining battery life, power consumption, processor speed, CPU load, and the like.

Peripherals interface 2016 can couple the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. In some examples, medium 2001 can be a non-transitory computer-readable storage medium. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 can run various software components stored in medium 2001 to perform various functions for system 2000. In some examples, the software components can include operating system 2022, communication module (or set of instructions) 2024, touch processing module (or set of instructions) 2026, graphics module (or set of instructions) 2028, and one or more applications (or set of instructions) 2030. Each of these modules and above noted applications can correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various examples. In some examples, medium 2001 may store a subset of the modules and data structures identified above. Furthermore, medium 2001 may store additional modules and data structures not described above.

Operating system 2022 can include various procedures, sets of instructions, software components and/or drivers for controlling and managing general system tasks (e.g., memory management, storage device control, power management, etc.) and facilitates communication between various hardware and software components.

Communication module 2024 can facilitate communication with other devices over one or more external ports 2036 or via RF circuitry 2008 and can include various software components for handling data received from RF circuitry 2008 and/or external port 2036.

Graphics module 2028 can include various known software components for rendering, animating and displaying graphical objects on a display surface. In examples in which touch I/O device 2012 is a touch sensing display (e.g., touch screen), graphics module 2028 can include components for rendering, displaying, and animating objects on the touch sensing display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 can include various software components for performing various tasks associated with touch I/O device 2012 including but not limited to receiving and processing touch input received from I/O device 2012 via touch I/O device controller 2032.

I/O subsystem 2006 can be coupled to touch I/O device 2012 and one or more other I/O devices 2014 for controlling or performing various functions. Touch I/O device 2012 can communicate with processing system 2004 via touch I/O device controller 2032, which can include various components for processing user touch input (e.g., scanning hardware). One or more other input controllers 2034 can receive/send electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 can display visual output to the user in a GUI. The visual output may include text, graphics, video, and any combination thereof. Some or all of the visual output may correspond to user-interface objects. Touch I/O device 2012 can form a touch sensing surface that accepts touch input from the user. Touch I/O device 2012 and touch screen controller 2032 (along with any associated modules and/or sets of instructions in medium 2001) can detect and track touches or near touches (and any movement or release of the touch) on touch I/O device 2012 and can convert the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensing surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

In examples for which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 can also include power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

Examples of the disclosure can be advantageous in allowing a user to expand a menu and select a menu item based on overscroll of a content area, making for a more intuitive and easy to use user interface.

In some examples, a computer-implemented method is disclosed. The method may include: displaying a user interface including an expandable menu and a scrollable content area; receiving user input scrolling the scrollable content area; detecting an overscroll of the content area based on the user input; and in response to detection of the overscroll, expanding the menu. Additionally or alternatively to one or more of the above examples, the method may further include: determining an overscroll value based on the user input; and selecting an item of the menu based on the overscroll value. Additionally or alternatively to one or more of the above examples, the method may further include: receiving user input including liftoff of a contact on a touch surface; in response to the liftoff, displaying content associated with the selected item of the menu. Additionally or alternatively to one or more of the above examples, the user interface may further include an item indicator and expanding the menu may include displaying an animation of the item indicator moving to the selected item of the menu. Additionally or alternatively to one or more of the above examples, selecting the item based on the overscroll value may include comparing the overscroll value to a predetermined overscroll threshold associated with the item and determining the overscroll value exceeds the predetermined overscroll threshold. Additionally or alternatively to one or more of the above examples, expanding the menu may include displaying a plurality of items of the menu. Additionally or alternatively to one or more of the above examples, the menu may be a drop-down menu and displaying the user interface including the menu may include displaying only a single item of the menu. Additionally or alternatively to one or more of the above examples, receiving the user input scrolling the scrollable content area may include receiving touch input dragging the scrollable content area.

In some examples, a non-transitory computer readable medium is disclosed. The computer readable medium may contain instructions that, when executed, perform a method including: displaying a user interface including an expandable menu and a scrollable content area; receiving user input scrolling the scrollable content area; detecting an overscroll of the content area based on the user input; and in response to detection of the overscroll, expanding the menu. Additionally or alternatively to one or more of the above examples, the method may further include: determining an overscroll value based on the user input; and selecting an item of the menu based on the overscroll value. Additionally or alternatively to one or more of the above examples, the method may further include: receiving user input including liftoff of a contact on a touch surface; in response to the liftoff, displaying content associated with the selected item of the menu. Additionally or alternatively to one or more of the above examples, the user interface may further include an item indicator and expanding the menu may include displaying an animation of the item indicator moving to the selected item of the menu. Additionally or alternatively to one or more of the above examples, selecting the item based on the overscroll value may include comparing the overscroll value to a predetermined overscroll threshold associated with the item and determining the overscroll value exceeds the predetermined overscroll threshold. Additionally or alternatively to one or more of the above examples, expanding the menu may include displaying a plurality of items of the menu. Additionally or alternatively to one or more of the above examples, the menu may be a drop-down menu and displaying the user interface including the menu may include displaying only a single item of the menu. Additionally or alternatively to one or more of the above examples, receiving the user input scrolling the scrollable content area may include receiving touch input dragging the scrollable content area.

In some examples, an electronic device is disclosed. The electronic device may include a processor to execute instructions and a memory coupled with the processor to store instructions, which when executed by the processor, cause the processor to perform operations to generate an application programming interface (API) that allows an API-calling component to perform a method including: displaying a user interface including an expandable menu and a scrollable content area; receiving user input scrolling the scrollable content area; detecting an overscroll of the content area based on the user input; and in response to detection of the overscroll, expanding the menu. Additionally or alternatively to one or more of the above examples, the method may further include: determining an overscroll value based on the user input; and selecting an item of the menu based on the overscroll value. Additionally or alternatively to one or more of the above examples, the method may further include: receiving user input including liftoff of a contact on a touch surface; in response to the liftoff, displaying content associated with the selected item of the menu. Additionally or alternatively to one or more of the above examples, the user interface may further include an item indicator and expanding the menu may include displaying an animation of the item indicator moving to the selected item of the menu. Additionally or alternatively to one or more of the above examples, selecting the item based on the overscroll value may include comparing the overscroll value to a predetermined overscroll threshold associated with the item and determining the overscroll value exceeds the predetermined overscroll threshold. Additionally or alternatively to one or more of the above examples, expanding the menu may include displaying a plurality of items of the menu. Additionally or alternatively to one or more of the above examples, the menu may be a drop-down menu and displaying the user interface including the menu may include displaying only a single item of the menu. Additionally or alternatively to one or more of the above examples, receiving the user input scrolling the scrollable content area may include receiving touch input dragging the scrollable content area.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method comprising:

at an electronic device with a display and one or more input devices:
concurrently displaying, in a user interface on the display, an expandable menu and a scrollable content area, the expandable menu including a first selectable menu item associated with first content and a second selectable menu item associated with second content, wherein:
the first selectable menu item that is associated with the first content is currently selected,
the expandable menu displays the first selectable menu item, and
the scrollable content area displays the first content;
receiving, via the one or more input devices, user input scrolling the first content in the scrollable content area;
detecting an overscroll of the first content in the scrollable content area based on the user input; and
in response to the detection of the overscroll, expanding the expandable menu to display the first selectable menu item and the second selectable menu item.

2. The method of claim 1, the method further comprising:
determining an overscroll value based on the user input, the overscroll value indicating an amount by which the user input has scrolled past an end of the first content; and
selecting a menu item included in the expandable menu, other than the first selectable menu item, based on the overscroll value.

3. The method of claim 2, the method further comprising:
receiving user input including liftoff of a contact on a touch surface;
in response to the liftoff, displaying, in the scrollable content area, content associated with the selected menu item when the liftoff of the contact was detected.

4. The method of claim 2, wherein the user interface includes an item indicator that indicates a currently selected menu item in the expandable menu, and expanding the expandable menu includes displaying an animation of the item indicator moving to the selected menu item of the expandable menu.

5. The method of claim 2, wherein selecting the menu item based on the overscroll value includes comparing the overscroll value to a predetermined overscroll threshold associated with the selected menu item and determining that the overscroll value exceeds the predetermined overscroll threshold.

6. The method of claim 3, the method further comprising, in response to the liftoff, collapsing the expandable menu, which includes hiding menu items other than the selected menu item, and displaying the selected menu item in the expandable menu.

7. The method of claim 1, wherein the expandable menu is a drop-down menu and displaying the expandable menu includes displaying only the first selectable menu item.

8. The method of claim 1, wherein receiving the user input scrolling the first content in the scrollable content area includes receiving touch input dragging the first content in the scrollable content area.

9. The method of claim 1, wherein:
the user input includes a dragging input, detected in the scrollable content area, that includes a contact and dragging of the contact, the dragging input continuing past an end of the first content in the scrollable content area such that the overscroll of the first content is detected, and the method further comprises:
after expanding the expandable menu, determining an amount by which the dragging input continues past the end of the first content in the scrollable content area;
selecting a respective selectable menu item, other than the first selectable menu item, in the expandable menu based on the amount by which the dragging input continues past the end of the first content in the scrollable content area;
while the respective selectable menu item is selected, detecting liftoff of the contact included in the dragging input; and
in response to detecting the liftoff of the contact included in the dragging input:
collapsing the expandable menu and displaying the respective selectable menu item in the expandable menu, without displaying the first selectable menu item in the expandable menu, after the expandable menu has collapsed; and
replacing the first content in the scrollable content area with respective content associated with the respective selectable menu item.

10. A non-transitory computer readable medium, the computer readable medium containing instructions that, when executed, perform a method comprising:
at an electronic device with a display and one or more input devices:
concurrently displaying, in a user interface on the display, an expandable menu and a scrollable content area, the expandable menu including a first selectable menu item associated with first content and a second selectable menu item associated with second content, wherein:
the first selectable menu item that is associated with the first content is currently selected,
the expandable menu displays the first selectable menu item, and
the scrollable content area displays the first content;
receiving, via the one or more input devices, user input scrolling the first content in the scrollable content area;
detecting an overscroll of the first content in the scrollable content area based on the user input; and
in response to the detection of the overscroll, expanding the expandable menu to display the first selectable menu item and the second selectable menu item.

11. The non-transitory computer readable medium of claim 10, the method further comprising:
determining an overscroll value based on the user input, the overscroll value indicating an amount by which the user input has scrolled past an end of the first content; and
selecting a menu item included in the expandable menu, other than the first selectable menu item, based on the overscroll value.

12. The non-transitory computer readable medium of claim 11, the method further comprising:
receiving user input including liftoff of a contact on a touch surface;
in response to the liftoff, displaying, in the scrollable content area, content associated with the selected menu item when the liftoff of the contact was detected.

13. The non-transitory computer readable medium of claim 11, wherein the user interface includes an item indicator that indicates a currently selected menu item in the expandable menu, and expanding the expandable menu includes displaying an animation of the item indicator moving to the selected menu item of the expandable menu.

14. The non-transitory computer readable medium of claim 11, wherein selecting the menu item based on the overscroll value includes comparing the overscroll value to a predetermined overscroll threshold associated with the selected menu item and determining that the overscroll value exceeds the predetermined overscroll threshold.

15. The non-transitory computer readable medium of claim 12, the method further comprising, in response to the liftoff, collapsing the expandable menu, which includes hiding menu items other than the selected menu item, and displaying the selected menu item in the expandable menu.

16. The non-transitory computer readable medium of claim 10, wherein the expandable menu is a drop-down menu and displaying the expandable menu includes displaying only the first selectable menu item.

17. The non-transitory computer readable medium of claim 10, wherein receiving the user input scrolling the first content in the scrollable content area includes receiving touch input dragging the first content in the scrollable content area.

18. The non-transitory computer readable medium of claim 10, wherein:
the user input includes a dragging input, detected in the scrollable content area, that includes a contact and dragging of the contact, the dragging input continuing past an end of the first content in the scrollable content area such that the overscroll of the first content is detected, and the method further comprises:
after expanding the expandable menu, determining an amount by which the dragging input continues past the end of the first content in the scrollable content area;
selecting a respective selectable menu item, other than the first selectable menu item, in the expandable menu based on the amount by which the dragging input continues past the end of the first content in the scrollable content area;
while the respective selectable menu item is selected, detecting liftoff of the contact included in the dragging input; and
in response to detecting the liftoff of the contact included in the dragging input:
collapsing the expandable menu and displaying the respective selectable menu item in the expandable menu, without displaying the first selectable menu item in the expandable menu, after the expandable menu has collapsed; and
replacing the first content in the scrollable content area with respective content associated with the respective selectable menu item.

19. An electronic device, comprising:
a display;
one or more input devices;
a processor to execute instructions; and
a memory coupled with the processor to store instructions, which when executed by the processor, cause the processor to perform operations to generate an application programming interface (API) that allows an API-calling component to perform a method comprising:
concurrently displaying, in a user interface on the display, an expandable menu and a scrollable content area, the expandable menu including a first selectable menu item associated with first content and a second selectable menu item associated with second content, wherein:

the first selectable menu item that is associated with the first content is currently selected,
the expandable menu displays the first selectable menu item, and
the scrollable content area displays the first content;
receiving, via the one or more input devices, user input scrolling the first content in the scrollable content area;
detecting an overscroll of the first content in the scrollable content area based on the user input; and
in response to the detection of the overscroll, expanding the expandable menu to display the first selectable menu item and the second selectable menu item.

20. The electronic device of claim 19, the method further comprising:
determining an overscroll value based on the user input, the overscroll value indicating an amount by which the user input has scrolled past an end of the first content; and
selecting a menu item included in the expandable menu, other than the first selectable menu item, based on the overscroll value.

21. The electronic device of claim 20, the method further comprising:
receiving user input including liftoff of a contact on a touch surface;
in response to the liftoff, displaying, in the scrollable content area, content associated with the selected menu item when the liftoff of the contact was detected.

22. The electronic device of claim 20, wherein the user interface includes an item indicator that indicates a currently selected menu item in the expandable menu, and expanding the expandable menu includes displaying an animation of the item indicator moving to the selected menu item of the expandable menu.

23. The electronic device of claim 20, wherein selecting the menu item based on the overscroll value includes comparing the overscroll value to a predetermined overscroll threshold associated with the selected menu item and determining that the overscroll value exceeds the predetermined overscroll threshold.

24. The electronic device of claim 21, the method further comprising, in response to the liftoff, collapsing the expandable menu, which includes hiding menu items other than the selected menu item, and displaying the selected menu item in the expandable menu.

25. The electronic device of claim 19, wherein the expandable menu is a drop-down menu and displaying the expandable menu includes displaying only the first selectable menu item.

26. The electronic device of claim 19, wherein receiving the user input scrolling the first content in the scrollable content area includes receiving touch input dragging the first content in the scrollable content area.

27. The electronic device of claim 19, wherein:
the user input includes a dragging input, detected in the scrollable content area, that includes a contact and dragging of the contact, the dragging input continuing past an end of the first content in the scrollable content area such that the overscroll of the first content is detected, and the method further comprises:
after expanding the expandable menu, determining an amount by which the dragging input continues past the end of the first content in the scrollable content area;
selecting a respective selectable menu item, other than the first selectable menu item, in the expandable menu based on the amount by which the dragging input continues past the end of the first content in the scrollable content area;

while the respective selectable menu item is selected, detecting liftoff of the contact included in the dragging input; and in response to detecting the liftoff of the contact included in the dragging input:
- collapsing the expandable menu and displaying the respective selectable menu item in the expandable menu, without displaying the first selectable menu item in the expandable menu, after the expandable menu has collapsed; and
- replacing the first content in the scrollable content area with respective content associated with the respective selectable menu item.

* * * * *